US012684079B2

(12) United States Patent
Ono

(10) Patent No.: US 12,684,079 B2
(45) Date of Patent: Jul. 14, 2026

(54) IMAGE READING APPARATUS AND IMAGE FORMING APPARATUS

(71) Applicant: CANON KABUSHIKI KAISHA, Tokyo (JP)

(72) Inventor: Takahiro Ono, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/946,642

(22) Filed: Nov. 13, 2024

(65) Prior Publication Data

US 2025/0168288 A1     May 22, 2025

(30) Foreign Application Priority Data

Nov. 16, 2023    (JP) ................................. 2023-195516

(51) Int. Cl.
| | |
|---|---|
| *H04N 1/04* | (2006.01) |
| *G03G 21/16* | (2006.01) |
| *H04N 1/00* | (2006.01) |
| *H04N 1/10* | (2006.01) |

(52) U.S. Cl.
CPC ........... *H04N 1/10* (2013.01); *G03G 21/1647* (2013.01); *H04N 1/00559* (2013.01); *H04N 1/103* (2013.01)

(58) Field of Classification Search
CPC ...... G03G 21/1647; H04N 1/10; H04N 1/103; H04N 1/00559
See application file for complete search history.

(56) References Cited

U.S. PATENT DOCUMENTS

| | | | |
|---|---|---|---|
| 6,611,364 B1* | 8/2003 | Craig ................... | H04N 1/1043 |
| | | | 358/497 |
| 2006/0039043 A1* | 2/2006 | Yeh ........................ | H04N 1/103 |
| | | | 358/474 |
| 2006/0044632 A1* | 3/2006 | Aoyama .............. | H04N 1/1017 |
| | | | 358/497 |
| 2018/0178565 A1* | 6/2018 | Kato ........................ | H04N 1/31 |
| 2020/0304676 A1* | 9/2020 | Watanabe .............. | H04N 1/103 |

FOREIGN PATENT DOCUMENTS

JP          2007274628 A       10/2007

* cited by examiner

*Primary Examiner* — Sophia S Chen
(74) *Attorney, Agent, or Firm* — Canon U.S.A., Inc. IP Division

(57)          ABSTRACT

An image reading apparatus includes a transparent member on which a sheet is placed, a reading unit including light receiving elements and configured to read an image on the sheet, a shaft member extending in a sub-scanning direction, a holding member including a first hole and configured to hold the reading unit so that the reading unit is movable along the shaft member, a sliding member including a second hole, attached to the holding member, and configured to slidably move with respect to the shaft member, a screw configured to fix the sliding member to the holding member, and a plate including a screw hole, wherein the screw inserted into the first and second holes is threadedly fitted to the screw hole in a state where the holding member is sandwiched by the plate and the sliding member, whereby the sliding member is fixed to the holding member.

11 Claims, 10 Drawing Sheets

IMAGE READING APPARATUS AND IMAGE FORMING APPARATUS

BACKGROUND

Field of the Disclosure

The present disclosure relates to an image reading apparatus that reads an image on a sheet and an image forming apparatus including the image reading apparatus.

Description of the Related Art

An existing image forming apparatus, such as a copy machine, a facsimile, and a multi-function apparatus, has included an image reading apparatus that reads an image on a document. As such an image reading apparatus, an image reading apparatus in which an image sensor held by a holding member reads an image on a document placed on a contact glass while moving along a guide member (shaft) extending in a sub-scanning direction is known (Japanese Patent Application Laid-Open No. 2007-274628).

A sliding member that is fitted to a shaft and slidably moves is assembled into the holding member that holds the image sensor. When the sliding member is attached to the holding member, there is a case where the sliding member is fixed to the holding member in a rotated state due to torque generated at the time of screw tightening. In such a case, there is an issue that the image sensor is held obliquely to a movement direction, and accuracy of reading an image deteriorates.

SUMMARY

The present disclosure is directed to provision of an image reading apparatus and an image forming apparatus that prevent rotation of a sliding member with respect to a holding member and are thereby capable of increasing accuracy of reading an image.

According to an aspect of the present disclosure, an image reading apparatus includes a transparent member on which a sheet is placed, a reading unit that includes light receiving elements arrayed in a main scanning direction, and that is configured to read an image on the sheet placed on the transparent member, a shaft member extending in a sub-scanning direction, a holding member that includes a first hole, and that is configured to hold the reading unit so that the reading unit is movable along the shaft member, a sliding member that includes a second hole, that is attached to the holding member, and that is configured to slidably move with respect to the shaft member, a screw that is configured to fix the sliding member to the holding member, and a plate that includes a screw hole to which the screw is threadedly fitted, wherein the screw inserted into the first hole and the second hole is threadedly fitted to the screw hole in a state where the holding member is sandwiched by the plate and the sliding member, whereby the sliding member is fixed to the holding member.

Further features of the present disclosure will become apparent from the following description of exemplary embodiments with reference to the attached drawings.

BRIEF DESCRIPTION OF THE DRAWINGS

FIG. 3 is a perspective view illustrating a reader.

FIG. 8 is a cross-sectional view illustrating the holder and a fastening portion of the sliding member.

DESCRIPTION OF THE EMBODIMENTS

An exemplary embodiment of the present disclosure will be described below with reference to the accompanying drawings. The exemplary embodiment is merely an example of embodying the present disclosure and does not limit the technical scope of the present disclosure.

Regarding Image Forming Apparatus

Figure 1:
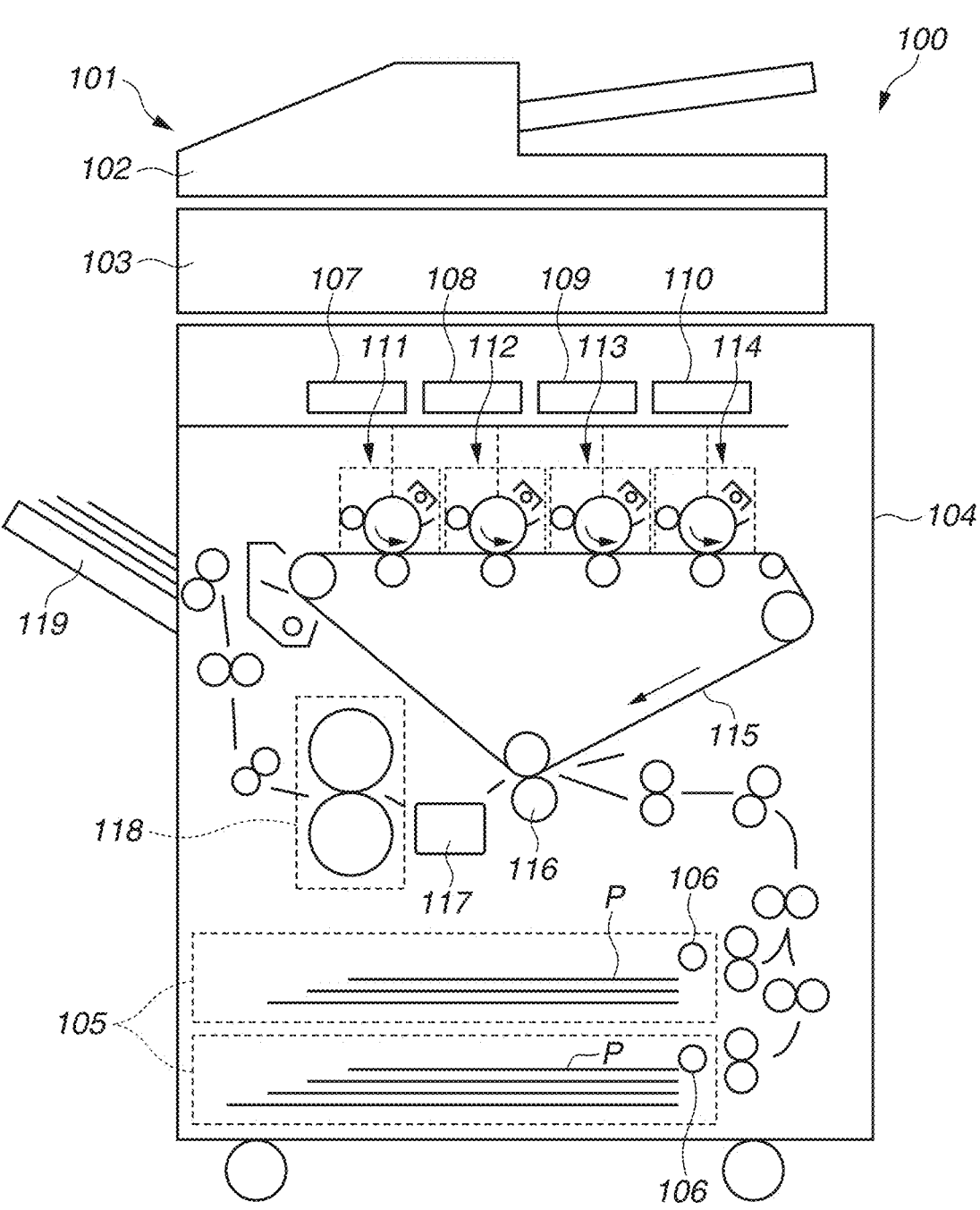
FIG. 1 is a cross-sectional view schematically illustrating an image forming apparatus.

An image forming apparatus 100 according to the present exemplary embodiment is now described with reference to FIG. 1. FIG. 1 is a cross-sectional view schematically illustrating the image forming apparatus 100 when viewed from the front side.

As illustrated in FIG. 1, the image forming apparatus 100 includes an image forming apparatus main body 104 and an image reading apparatus 101 provided above the image forming apparatus main body 104. The image forming apparatus 100 forms a toner image on paper P based on image data read by the image reading apparatus 101 or an image signal from a host apparatus such as a personal computer communicably connected to the image forming apparatus 100. Examples of the paper P as a recording medium include a sheet material such as plain paper, a plastic film, and a cloth.

The image forming apparatus main body 104 includes therein four laser scanners 107 to 110 and four image forming units 111 to 114 corresponding to yellow (Y), magenta (M), cyan (C), and black (K), as image forming units using electrophotography, and a fixing unit 118. The laser scanners 107 to 110 emit laser beams to respective photosensitive drums included in the image forming units 111 to 114 based on an input image signal. These image forming units 111 to 114 are disposed along an intermediate transfer belt 115.

In the image forming unit 111, a yellow toner image is formed, and the formed yellow toner image is primarily transferred to the intermediate transfer belt 115. In the image forming unit 112, a magenta toner image is formed, and the formed magenta toner image is primarily transferred to the intermediate transfer belt 115 so as to be superimposed on the transferred yellow toner image. In the image forming unit 113, a cyan toner image is formed, and the formed cyan toner image is primarily transferred to the intermediate transfer belt 115 so as to be superimposed on the transferred yellow and magenta toner images. In the image forming unit 114, a black toner image is formed, and the formed black toner image is primarily transferred to the intermediate transfer belt 115 so as to be superimposed on the transferred yellow, magenta, and cyan toner images.

A paper feed cassette 105 is disposed in a lower portion of the image forming apparatus main body 104 so that the paper feed cassette 105 can be pulled out to the front of the image forming apparatus main body 104. The image forming apparatus 100 feeds the paper P accommodated in the paper feed cassette 105 with a pickup roller 106 to a secondary transfer nip portion that is in contact with the intermediate transfer belt 115 and a secondary transfer unit 116. At the time of conveyance of the paper P, the image forming apparatus 100 conveys the paper P in synchronization with a toner image on the intermediate transfer belt 115. The multi-layered toner image on the intermediate transfer belt 115 is transferred onto the paper P in the secondary transfer nip portion using an action of a secondary transfer bias voltage to be applied to the secondary transfer unit 116.

The paper P to which the toner image has been secondarily transferred by the secondary transfer unit 116 is conveyed by a conveyance belt 117 to the fixing unit 118. The toner image is heated and pressed by the fixing unit 118 and is fixed to a surface of the paper P, and the paper P is thereafter discharged to a discharge tray 119.

In the present exemplary embodiment, the image forming apparatus 100 includes an electrophotographic image forming means, but the image forming means is not limited to the electrophotographic image forming means and may be another image forming means using an inkjet method or the like.

Regarding Image Reading Apparatus

Figure 2:
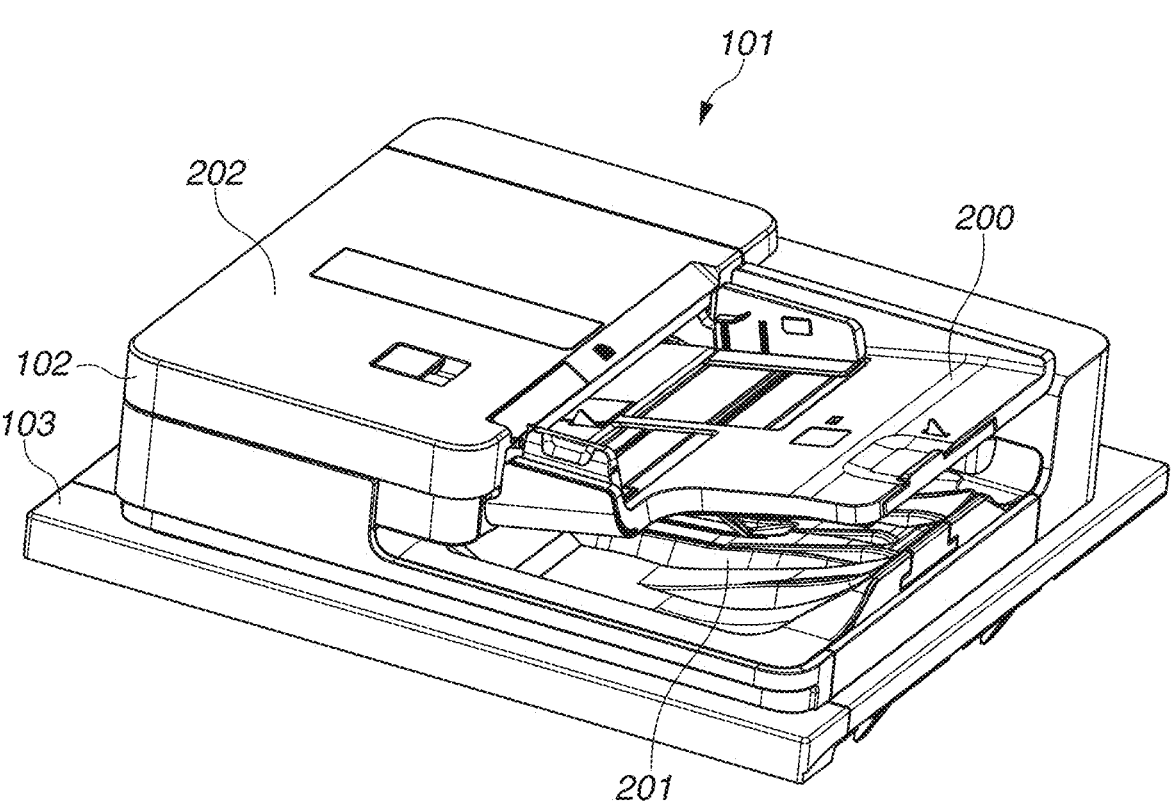
FIG. 2 is a perspective view illustrating the image reading apparatus.
Figure 3:
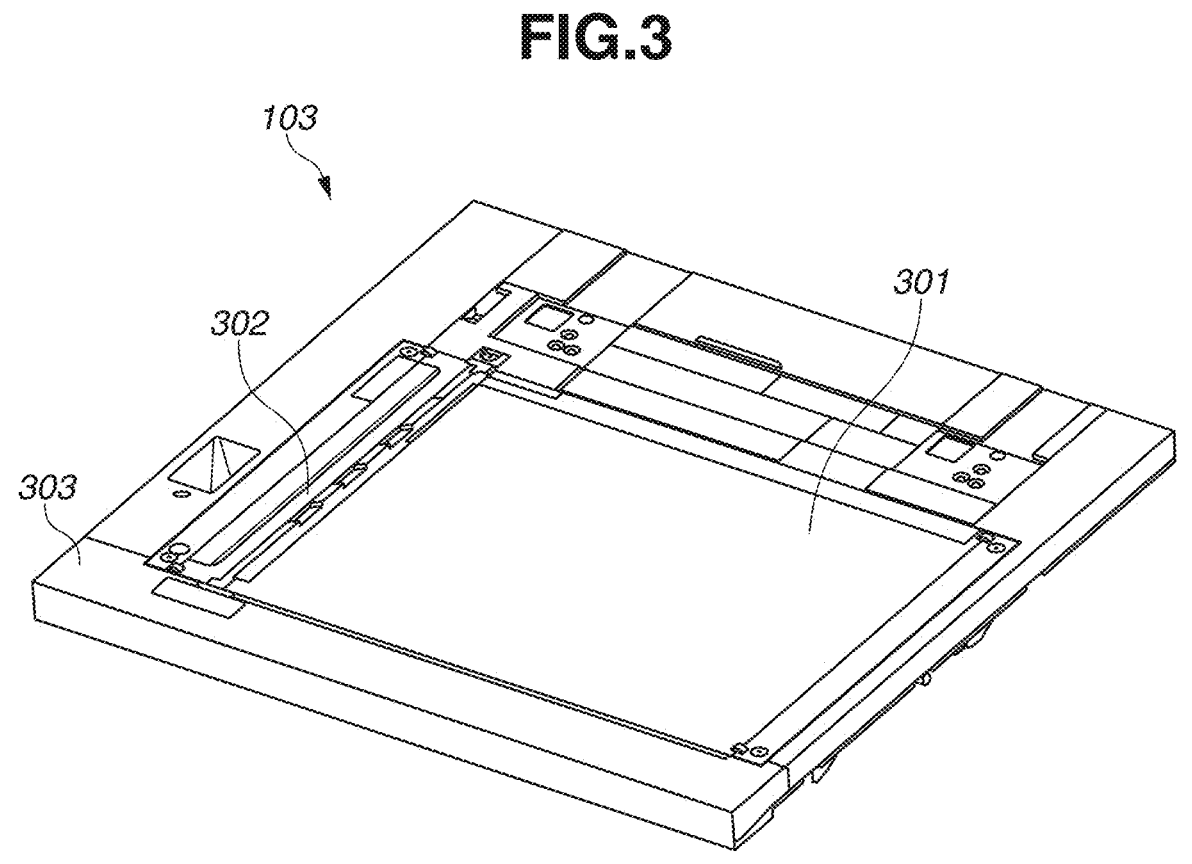
Figure 4:
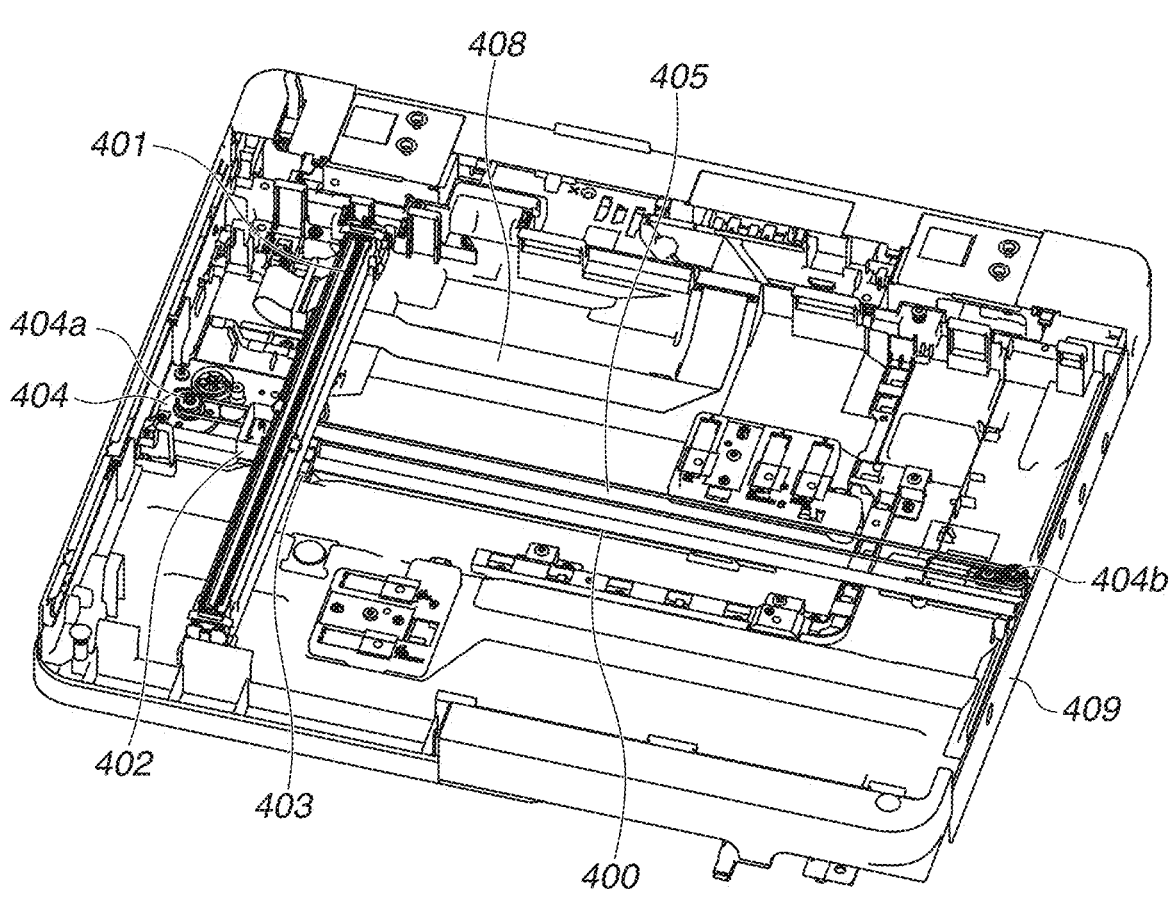
FIG. 4 is a perspective view illustrating an internal configuration of the reader.
Figure 5:
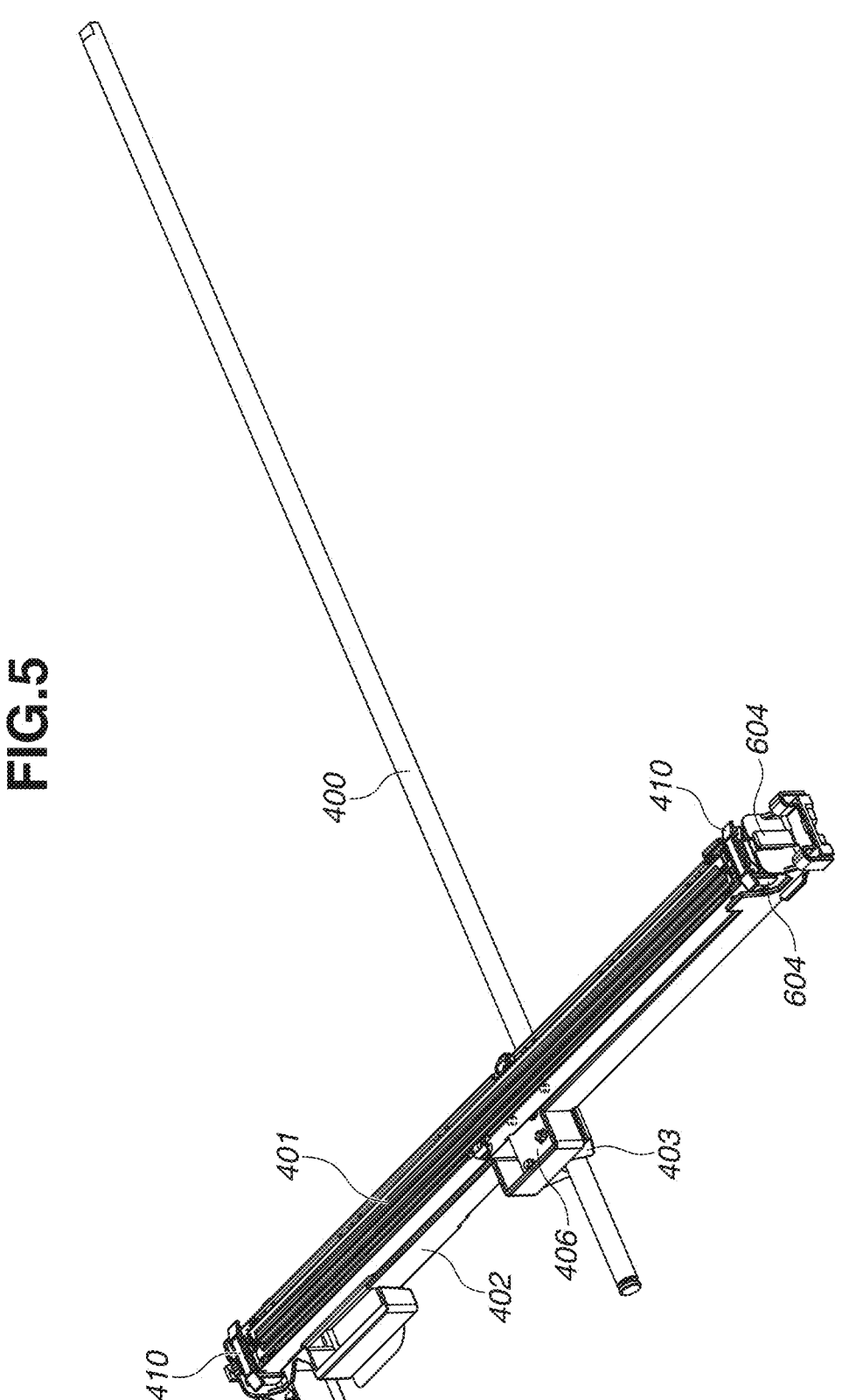
FIG. 5 is a perspective view illustrating a reading unit and a shaft.
Figure 6:
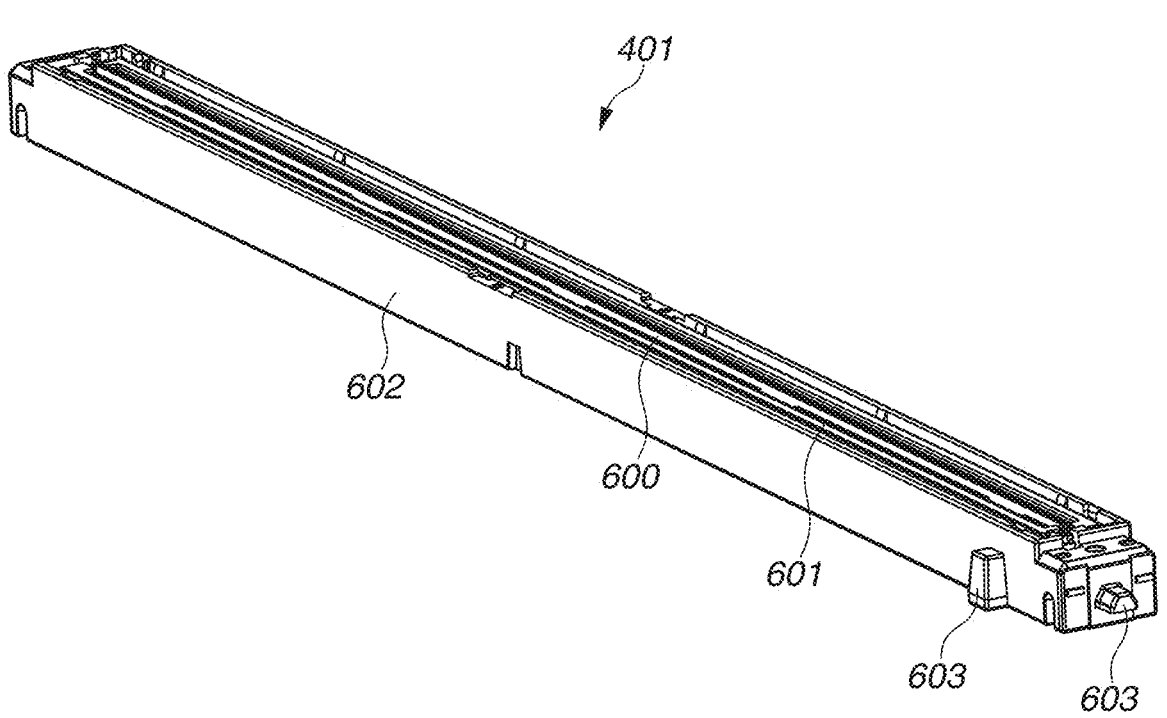
FIG. 6 is a perspective view illustrating the reading unit.

The image reading apparatus 101 is now described. FIG. 2 is a perspective view illustrating the image reading apparatus 101. FIG. 3 is a perspective view illustrating a reader 103. FIG. 4 is a perspective view illustrating an internal configuration of the reader 103. FIG. 5 is a perspective view illustrating a reading unit 401 and a shaft 400. FIG. 6 is a perspective view illustrating the reading unit 401.

As illustrated in FIG. 2, the image reading apparatus 101 includes an auto document feeder (hereinafter referred to as ADF) 102, and the reader 103.

The image reading apparatus 101 is capable of executing document-flow-reading to read an image on a document while conveying the document with the ADF 102 and document-fixed-reading to read an image on a document placed on the reader 103. The document means a sheet whose image is read by the image reading apparatus 101.

As illustrated in FIG. 2, the ADF 102 includes a document tray 200 (stack tray) on which a document is stacked, a conveyance unit 202 that conveys the document, and a discharge tray 201 to which the document whose image has been read is discharged. The conveyance unit 202 includes a plurality of rollers such as a pickup roller that feeds the document stacked on the document tray 200, a separation roller that separates the document one sheet by one sheet, and a conveyance roller that conveys the separated document. In a case of the document-flow-reading, an image on the document set on the document tray 200 is read by the reading unit 401 while the document is conveyed by the conveyance unit 202, and the document is thereafter discharged to the discharge tray 201. The ADF 102 may include therein a different reading unit other than the reading unit 401, and the reading unit 401 may read an image on the surface of the document and the different reading unit provided inside the ADF 102 reads an image on the back surface of the document.

As illustrated in FIG. 3, the reader 103 includes a transparent platen glass 301, a transparent document feeding-reading glass 302, and a cover 303 as an exterior package of the reader 103. The platen glass 301 is one example of a transparent member on which the document is placed. Furthermore, as illustrated in FIG. 4, the reader 103 includes the shaft 400, the reading unit 401, a holder 402, a sliding member 403, a motor 404, a timing belt 405, and a cable 408. Each of the above-mentioned members provided in the reader 103 is accommodated in a frame 409, and an upper portion of the frame 409 is covered with the platen glass 301, the document feeding-reading glass 302, and the cover 303. The frame 409 may be made of resin or metal.

The reading unit 401 is a contact image sensor (hereinafter referred to as CIS), which is a scanning device of an equal-magnification optical system. As illustrated in FIG. 6, the reading unit 401 includes a lens 600, a light source 601 composed of an array of light emitting diodes (LED) arranged in a main scanning direction, a plurality of light receiving elements arrayed in the main scanning direction, and a case 602 that accommodates the lens 600, the light source 601, and the light receiving elements. Light that has been emitted from the light source 601 and reflected by the document is condensed to form an image on each light receiving element via the lens 600, and is photoelectrically converted by the light receiving elements. The image data on the document, which has been read by the reading unit 401, is transmitted to a control substrate through the cable 408. The control substrate is not illustrated. A plurality of protrusions 603 is formed on two end portions of the case 602 in a longitudinal direction and a side surface of the case 602 in the sub-scanning direction. These protrusions 603 are engaged with respective grooves 604 formed in the holder 402, whereby the reading unit 401 is positioned with respect to the holder 402.

The shaft 400 is a metal shaft member that extends in the sub-scanning direction that is orthogonal to the main scanning direction.

Two end portions of the shaft 400 in an axis direction (sub-scanning direction) are supported by the frame 409. The holder 402 holds the reading unit 401 so as to be movable along the shaft 400 in the axis direction (sub-scanning direction). The holder 402 is composed of a first wall portion 605 and a second wall portion 606 that face the case 602 for the reading unit 401 in the sub-scanning direction, and a base 607 that faces the case 602 in a vertical direction (refer to FIG. 9). A sliding member 403 that is fitted to the shaft 400 and slidably moves is attached to a lower surface of the base 607 of the holder 402. As will be described in detail later, the sliding member 403 is fixed to the holder 402 with a plate 406 and a plurality of screws 407. In the sliding member 403, a sliding groove 403b to which the shaft 400 is fitted is formed so as to extend in the sub-scanning direction (refer to FIG. 10). In the present exemplary embodiment, the holder 402 and the sliding member 403 are formed of a resin material.

As illustrated in FIG. 4, the motor 404 is disposed on one side of the reader 103 in the sub-scanning direction. A driving pulley 404a is provided on a motor shaft of the motor 404, and a driven pulley 404b is provided on the opposite side of the motor 404 in the sub-scanning direction of the reader 103. The timing belt 405 is attached to the driving pulley 404a and the driven pulley 404b along the shaft 400 and is rotatable by the motor 404. In the sliding member 403, a belt pinching portion 403c that pinches the timing belt 405 is formed (refer to FIG. 10). The belt pinching portion 403c pinches the timing belt 405 with two facing surfaces on which irregularities are formed. This makes the holder 402 and the reading unit 401 movable in the sub-scanning direction with the rotation of the timing belt 405.

Upper sliding members 410 that slidably move with respect to the platen glass 301 are provided on the respective two ends of the reading unit 401 in the main scanning direction. The reading unit 401 is being urged toward the platen glass 301 by a spring disposed between the reading unit 401 and the holder 402. The spring is not illustrated. For this reason, when the reading unit 401 slidably moves in the sub-scanning direction along the shaft 400, the upper sliding members 410 slidably move with respect to a lower surface of the platen glass 301.

In this manner, in the image reading apparatus 101, the reading unit 401 is capable of reading an image on the document placed on the platen glass 301 while moving along the shaft 400 in the sub-scanning direction. The ADF 102 is provided to be pivotable with respect to the reader 103 with a hinge, which is not illustrated. The ADF 102 functions as a pressing portion that presses the document placed on the platen glass 301 so that the document does not move, in a state where the ADF 102 is closed with respect to reader 103.

Regarding Attachment of Sliding Member

Figure 7:
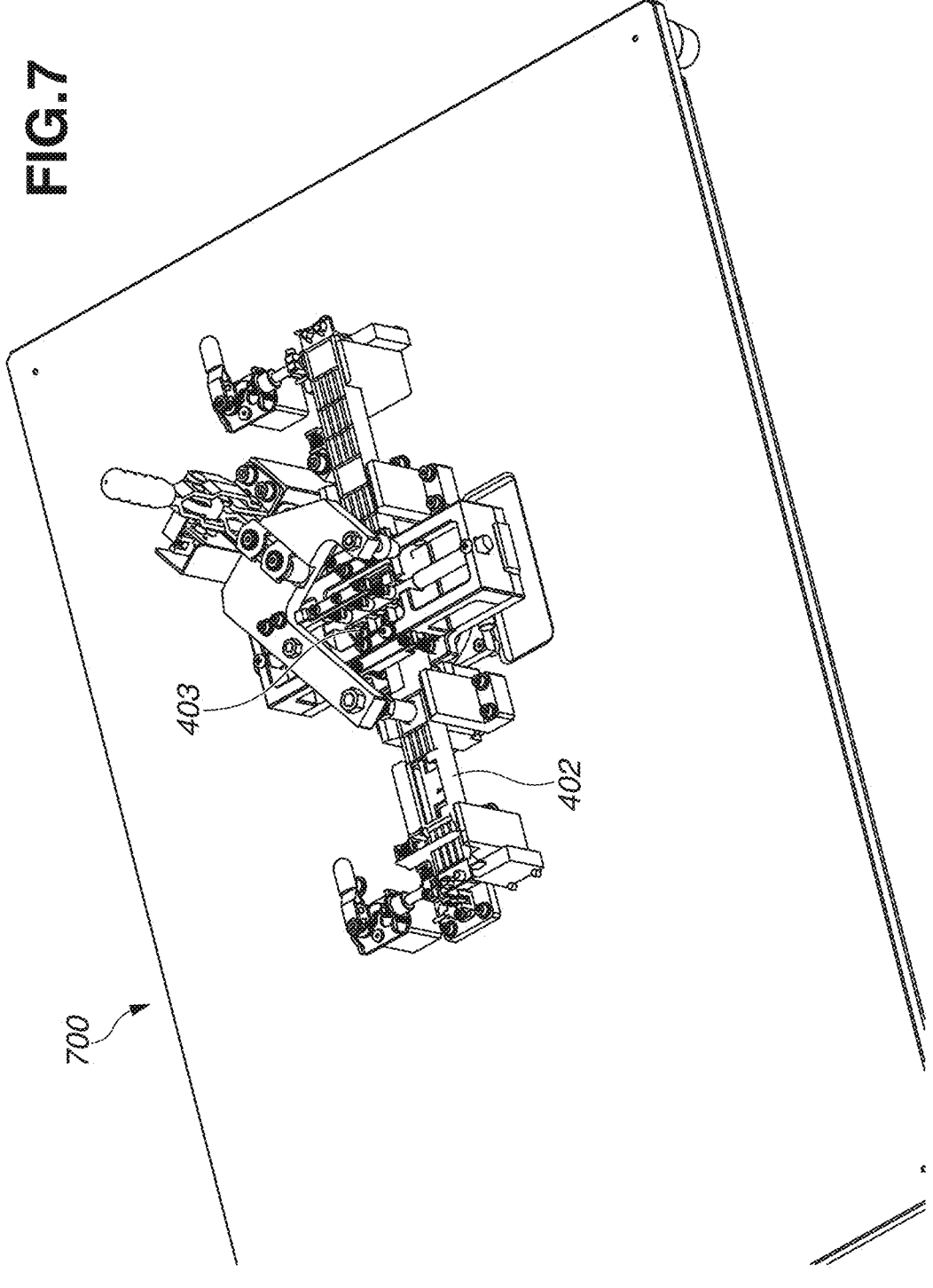
FIG. 7 is a perspective view illustrating an assembly jig for attaching a sliding member to a holder.
Figure 8:
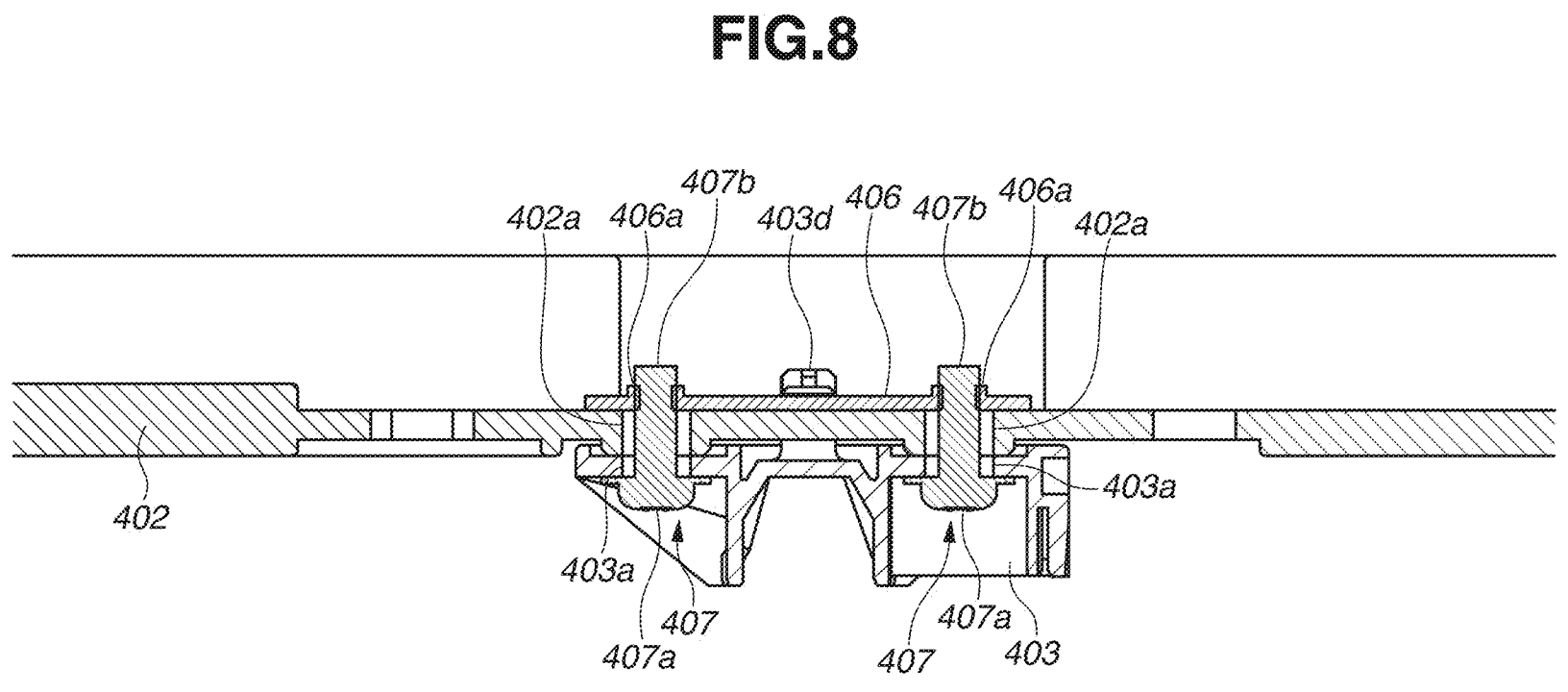
Figure 9:
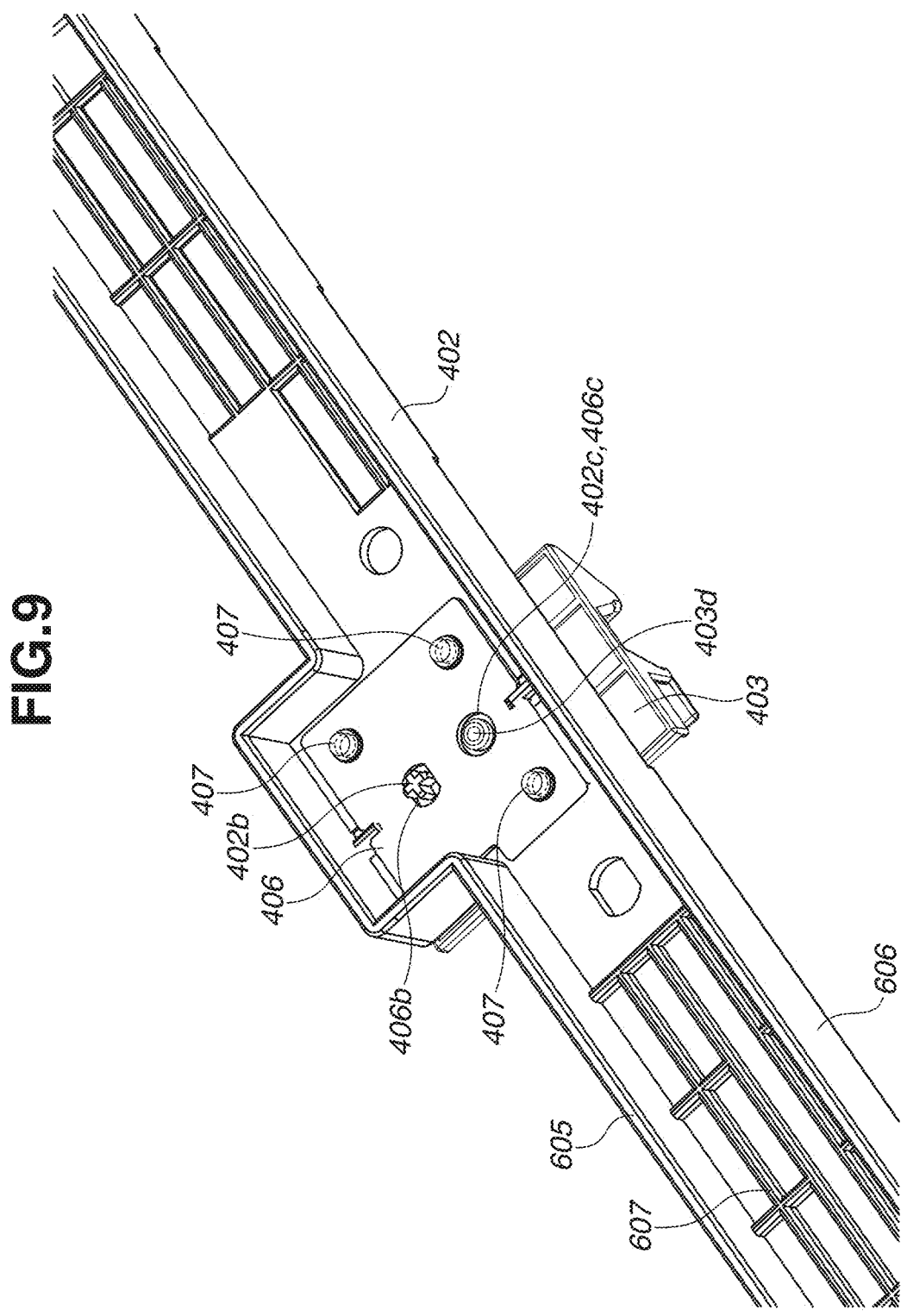
FIG. 9 is a perspective view illustrating the holder and the fastening portion of the sliding member.
Figure 10:
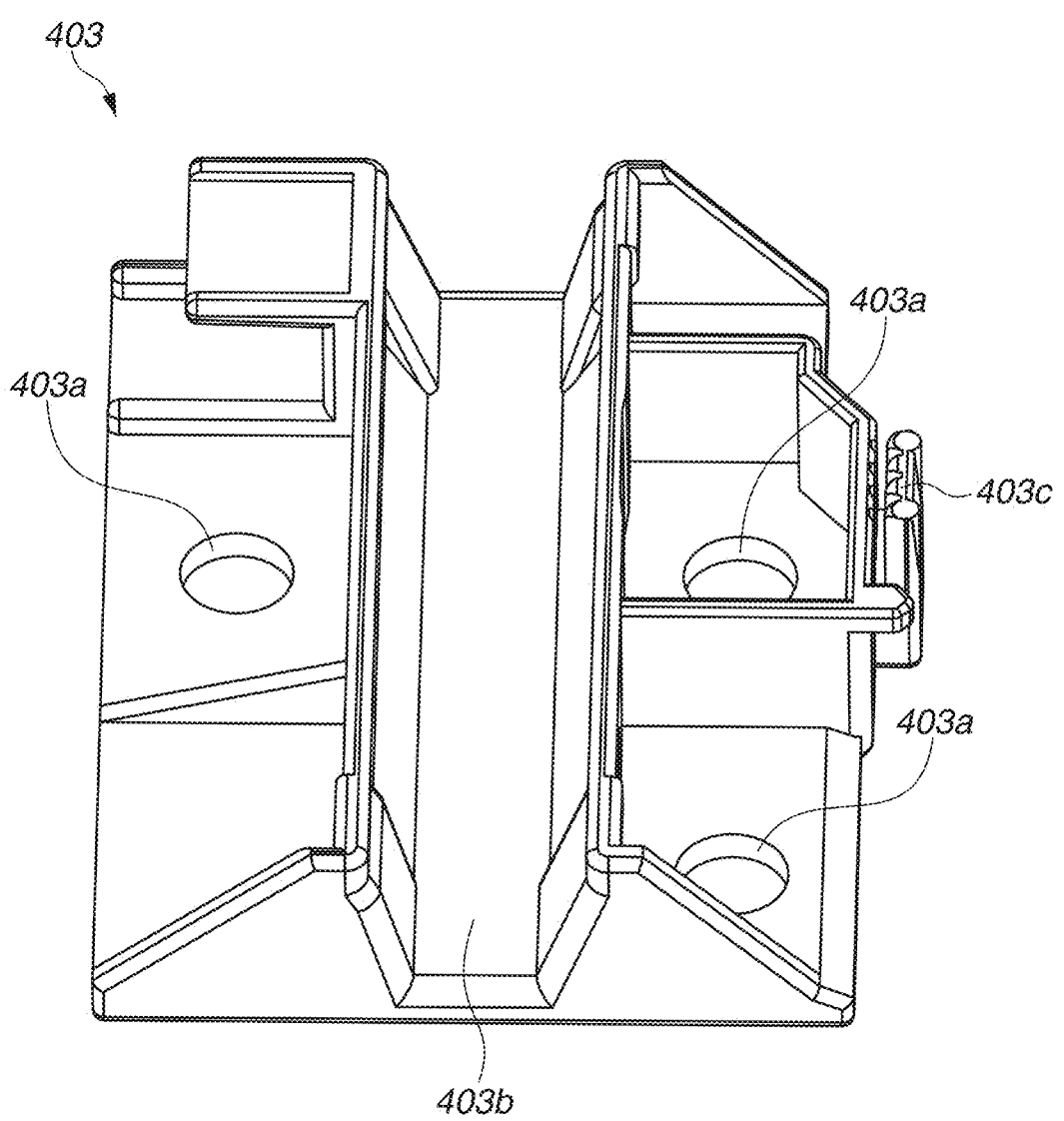
FIG. 10 is a perspective view illustrating the sliding member.

How to attach the sliding member 403 to the holder 402 is now described. FIG. 7 is a perspective view illustrating an assembly jig 700 for attaching the sliding member 403 to the holder 402. FIG. 8 is a cross-sectional view illustrating the holder 402 and a fastening portion of the sliding member 403. FIG. 9 is a perspective view illustrating the holder 402 and the fastening portion of the sliding member 403. FIG. 10 is a perspective view illustrating the sliding member 403.

As illustrated in FIG. 9, the plate 406 for fixing the sliding member 403 to the holder 402 is disposed on a surface of the holder 402 on the opposite side of the sliding member 403 (upper surface of the base 607). The plate 406 is a metal plate member in which screw holes 406a to which the respective screws 407 are threadedly fitted are formed at three locations. The screw 407 is a screw including a head 407a and a screw portion 407b. Holes 403a into which the respective screws 407 are inserted are formed in the sliding member 403 at three locations. Holes 402a into which the respective screws 407 are inserted are formed in the holder 402 at three locations corresponding to the holes 403a of the sliding member 403. The hole 402a formed in the holder 402 is an example of a first hole, and the hole 403a formed in the sliding member 403 is an example of a second hole. As illustrated in FIG. 8, the screws 407 inserted into the respective holes 402a and the respective holes 403a are threadedly fitted to the respective screw holes 406a in a state where the base 607 of the holder 402 is sandwiched by the plate 406 and the sliding member 403, whereby the sliding member 403 is fixed to the holder 402. The threadedly-fitting mentioned herein means insertion of a screw while rotating the screw so that the screw is meshed with a screw hole.

The hole 402a in the holder 402 and the hole 403a in the sliding member 403 are each larger than the external form of the screw 407, and each have a gap from the screw portion 407b of the screw 407 in a state where the screw 407 is inserted. That is, the hole 402a in the holder 402 and the hole 403a in the sliding member 403 are each formed to have a hole diameter larger than that of the screw hole 406a in the plate 406.

A protrusion 402b protruding toward the plate 406 is formed on a surface of the holder 402 on which the plate 406 is disposed (the upper surface of the base 607). A protrusion 403d protruding toward the holder 402 is formed on the surface of the sliding member 403 in contact with the holder 402. The protrusion 403d of the sliding member 403 is an example of a first protrusion, and the protrusion 402b of the holder 402 is an example of a second protrusion. Besides the three holes 402a, a through-hole 402c is formed in the holder 402. Besides the three screw holes 406a, through-holes 406b and 406c are formed in the plate 406. The through-hole 402c formed in the holder 402 is an example of a third hole. The through-hole 406c formed in the plate 406 is an example of a fourth hole, and the through-hole 406b is an example of a fifth hole. In a state before the sliding member 403 is fastened with the holder 402, the protrusion 402b is inserted into the through-hole 406b, and the protrusion 403d is inserted into the through-holes 402c and 406c, whereby the sliding member 403 and the holder 402 can be temporarily assembled. In the state of temporary assembling, the sliding member 403 is rotatable with respect to the holder 402 about the protrusion 403d. With this configuration, it is possible to adjust the angle of the sliding member 403 with respect to the holder 402 in the temporary assembling state to fix the sliding member 403.

The assembly jig 700 illustrated in FIG. 7 is capable of holding the holder 402 and the sliding member 403 that have been temporarily assembled at a freely-selected angle. Meanwhile, in a process of manufacturing the reading unit 401, there is a case where a reading area of the reading unit 401 (in the main scanning direction) is slightly inclined with respect to a longitudinal direction of the case 602. That is, there are variations in a relationship between the reading area of the reading unit 401 and the case 602 depending on individual pieces. For this reason, it is necessary to adjust the angle of the sliding member 403 with respect to the holder 402 depending on an angle between the reading area of the reading unit 401 and the longitudinal direction of the case 602.

An operator uses a measuring instrument to preliminarily measure variations in the angle of the reading area of the reading unit 401 with respect to the case 602. The holder 402 and the sliding member 403 are held by the assembly jig 700 at an angle depending on an individual piece of the reading unit 401. Thereafter, the holder 402 and the sliding member 403 are sandwiched between the head 407a of the screw 407 and the plate 406 and thereby fixed to each other. With this configuration, it is possible to assemble the holder 402 and the sliding member 403 so that the reading area of the reading unit 401 and the axis direction of the shaft 400 are perpendicular to each other. To increase the accuracy of reading an image, it is necessary that the main scanning direction of the reading unit 401 is perpendicular to the axial direction of the shaft 400. Especially, in a machine-type supporting a document of A3 (a length of 250 mm in the main scanning direction) or larger, an error in the angle largely contributes to the accuracy of reading the image so that an emphasis is placed on assembling with high accuracy.

Supposing that the sliding member 403 is fixed to the holder 402 without use of the plate 406, the screw 407 is threadedly fitted to a screw hole formed in the holder 402 and the sliding member 403. In such a case, when the screw 407 is threadedly fitted to the screw hole formed in the holder 402 and the sliding member 403, the holder 402 and the sliding member 403 are relatively rotated by rotational torque of the screw 407. Hence, there is an issue that the axis direction of the shaft 400 and the reading area of the reading unit 401 are not perpendicular to each other and the accuracy of reading the image decreases.

In contrast, in the present exemplary embodiment, the screw 407 inserted into the hole 402*a* and the hole 403*a* is threadedly fitted to the screw hole 406*a* in a state where the holder 402 is sandwiched by the plate 406 and the sliding member 403, whereby the sliding member 403 is fixed to the holder 402. That is, the holder 402 and the sliding member 403 are sandwiched by the screw 407 and the plate 406 and thereby fixed to each other. This prevents the rotation of the sliding member 403 with respect to the holder 402 by rotation torque of the screw 407 and can thereby increase the accuracy of reading the image.

In the present exemplary embodiment, the hole 402*a* in the holder 402 and the hole 403*a* in the sliding member 403 are each larger than the external form of the screw 407, and each have a gap from the screw 407 in a state where the screw 407 is inserted. That is, the hole 402*a* in the holder 402 and the hole 403*a* in the sliding member 403 each have a larger hole diameter than that of the screw hole 406*a* in the plate 406. This can prevent transmission of rotation torque of the screw 407 to the holder 402 and the sliding member 403 and can further increase the accuracy of reading the image.

In the present exemplary embodiment, the protrusion 402*b* is inserted into the through-hole 406*b*, and the protrusion 403*d* is inserted into the through-holes 402*c* and 406*c*, whereby the sliding member 403 and the holder 402 can be temporarily assembled. Hence, it is possible to adjust the angle of the sliding member 403 with respect to the holder 402 in the temporary assembling state, and then fix the sliding member 403.

According to the present disclosure, it is possible to provide an image reading apparatus and an image forming apparatus that prevent rotation of the sliding member with respect to the holding member and are thereby capable of increasing accuracy of reading an image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-195516, filed Nov. 16, 2023, which is hereby incorporated by reference herein in its entirety.

What is claimed is:

1. An image reading apparatus comprising:
a transparent member on which a sheet is placed;
a reading unit that includes light receiving elements arrayed in a main scanning direction, and that is configured to read an image on the sheet placed on the transparent member;
a shaft member extending in a sub-scanning direction;
a holding member that includes a first hole, and that is configured to hold the reading unit so that the reading unit is movable along the shaft member;
a sliding member that includes a second hole, that is attached to the holding member, and that is configured to slidably move with respect to the shaft member;
a screw that is configured to fix the sliding member to the holding member; and
a plate that includes a screw hole to which the screw is threadedly fitted,
wherein the screw inserted into the first hole and the second hole is threadedly fitted to the screw hole in a state where the holding member is sandwiched by the plate and the sliding member, whereby the sliding member is fixed to the holding member.

2. The image reading apparatus according to claim 1, wherein each of the first hole and the second hole is larger in diameter than the screw hole.

3. The image reading apparatus according to claim 1,
wherein the sliding member includes a first protrusion that protrudes from a surface of the sliding member, the surface being in contact with the holding member,
wherein the holding member includes a third hole into which the first protrusion is inserted, and
wherein the plate includes a fourth hole into which the first protrusion is inserted.

4. The image reading apparatus according to claim 3,
wherein the holding member includes a second protrusion that protrudes from a surface of the holding member, the surface of the holding member being in contact with the plate, and
wherein the plate includes a fifth hole into which the second protrusion is inserted.

5. The image reading apparatus according to claim 1, wherein the holding member and the sliding member are formed of a resin material.

6. The image reading apparatus according to claim 1, further comprising:
a motor; and
a belt provided so as to be rotatable by the motor,
wherein the sliding member includes a pinching portion configured to pinch the belt, and
wherein the reading unit is movable in the sub-scanning direction by rotation of the belt.

7. The image reading apparatus according to claim 1, further comprising a pressing unit that is provided so as to be pivotable and that is configured to press the sheet placed on the transparent member.

8. The image reading apparatus according to claim 7,
wherein the pressing unit includes a stack tray on which a sheet is stacked, a conveyance unit configured to convey the sheet stacked on the stack tray, and a discharge tray to which the sheet discharged from the conveyance unit is discharged, and
wherein the reading unit is configured to read the image on the sheet conveyed by the conveyance unit.

9. An image forming apparatus comprising:
a transparent member on which a sheet is placed;
a reading unit that includes light receiving elements arrayed in a main scanning direction, and that is configured to read an image on the sheet placed on the transparent member;
a shaft member extending in a sub-scanning direction;
a holding member that includes a first hole, and that is configured to hold the reading unit so that the reading unit is movable along the shaft member;
a sliding member that includes a second hole, that is attached to the holding member, and that is configured to slidably move with respect to the shaft member;
a screw that is configured to fix the sliding member to the holding member;
a plate that includes a screw hole to which the screw is threadedly fitted; and
an image forming unit configured to form an image on a recording medium based on the image read by the reading unit,
wherein the screw inserted into the first hole and the second hole is threadedly fitted to the screw hole in a state where the holding member is sandwiched by the plate and the sliding member, whereby the sliding member is fixed to the holding member.

10. An image reading apparatus comprising:

a transparent member on which a sheet is placed;

a reading unit that is configured to read an image on the sheet placed on the transparent member;

a shaft member;

a holding member that includes a first hole, and that is configured to hold the reading unit so that the reading unit is movable along the shaft member;

a sliding member that includes a second hole, that is attached to the holding member, and that is configured to slidably move with respect to the shaft member;

a screw that is configured to fix the sliding member to the holding member, and that includes a head; and a plate that includes a screw hole to which the screw is threadedly fitted, wherein the screw inserted into the first hole and the second hole is threadedly fitted to the screw hole in a state where the holding member and the sliding member are sandwiched by the plate and the head of the screw, whereby the sliding member is fixed to the holding member.

11. The image reading apparatus according to claim 10, wherein the sliding member includes a first protrusion that protrudes from a surface of the sliding member, the surface being in contact with the holding member, wherein the holding member includes a third hole into which the first protrusion is inserted, and wherein the plate includes a fourth hole into which the first protrusion is inserted.

* * * * *